Feb. 9, 1960 W. H. FRANK ET AL 2,924,804
ELECTRIC DISTRIBUTION SYSTEM
Original Filed Oct. 20, 1951

INVENTORS.
William H. Frank,
Elwood T. Platz,
BY
J. Robert Schafer
Their Attorney.

United States Patent Office 2,924,804
Patented Feb. 9, 1960

2,924,804

ELECTRIC DISTRIBUTION SYSTEM

William H. Frank and Elwood T. Platz, Detroit, Mich., assignors, by mesne assignments, to I-T-E Circuit Breaker Company, Philadelphia, Pa., a corporation of Pennsylvania Original application October 20, 1951, Serial No. 252,272. Divided and this application January 3, 1956, Serial No. 556,907

3 Claims. (Cl. 339—21)

This invention relates to a continuous outlet electric distribution system and particularly to a conductor duct utilized in such systems.

The distribution system is designed to provide a source of electric power readily usable at any point along the duct length. In addition to the conductor duct which is described and claimed herein, the system includes outlet receptacles which are attachable at any point along the duct length and feed-in devices through which the duct is supplied with electric current. The duct comprises generally a casing of dielectric material having portions which partially enclose metallic conductors.

This application is a division of application Number 252,272 which was filed October 20, 1951, and assigned to the assignee of this application, now abandoned.

A primary object of the invention is to provide a distribution system with a conductor duct having a continuous outlet that may have outlet receptacles easily and directly connected thereto at any point along its length without requiring the piercing of the conductor covering, or any other type of connection that may require tools or special working. Furthermore, while the duct conductors are exposed for direct electrical contact with the outlet receptacles, still, the conductor arrangement within the duct is such that it not likely that the conductors will present opportunities for injury or damage due to accidental or irresponsible tamperings therewith.

Another object of the invention is to provide a continuous outlet conductor duct which can be easily and economically installed and one that presents an attractive appearance.

Another object of the invention is to provide a continuous outlet conductor duct having a polarizing means which insures attachment of the outlet receptacles in one way to insure proper fusing of the distribution system, etc., or in instances having one wire grounded, the grounded conductor may be uniformly recognized by its relation to the polarizing scheme employed.

A still further object is to provide a continuous outlet conductor duct having the conductor elements concealed so as to not present a source of danger or be easily affected by exposure to water, paint, dust, or other elements that might impair the operation or utility of the duct. The particular arrangement of the conductors in the duct insures cleanliness of the conductors and good electrical contact at all times between the outlet receptacles and the duct conductors.

Still other objects and advantages of the invention will be apparent to those skilled in the art after a consideration of the description and drawings wherein.

Figure 1:
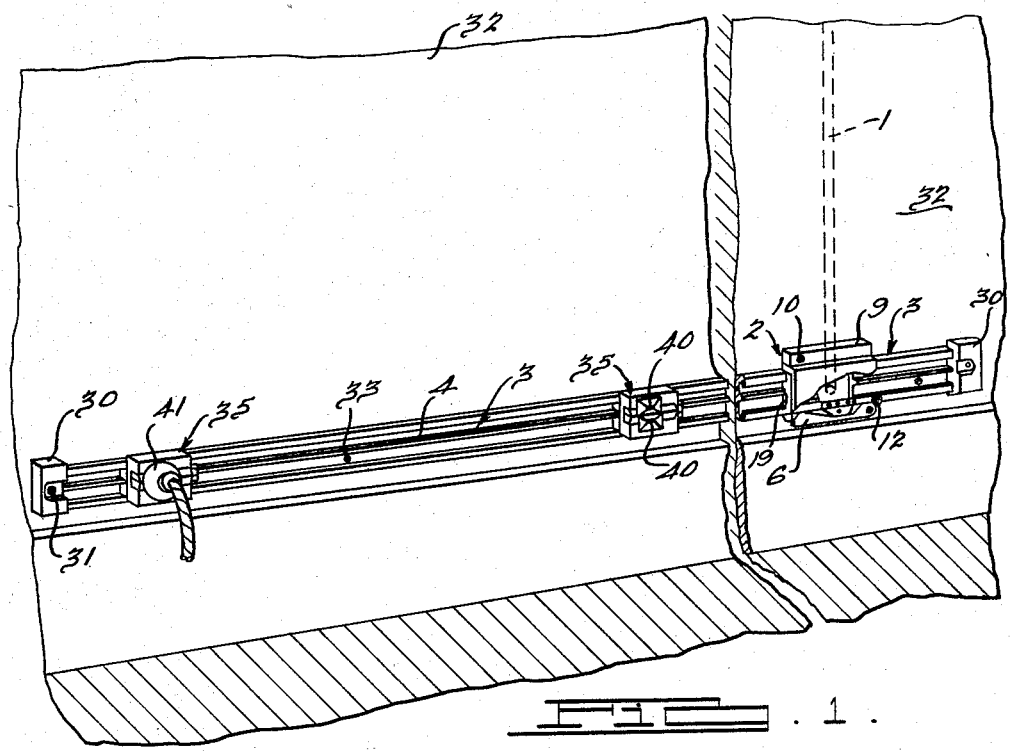
Fig. 1 is a perspective view of a building wall having mounted thereon a continuous outlet electric distribution system including a conductor duct which is an embodiment of the invention.

Referring to Fig. 1 of the drawing a continuous outlet electric distribution system is shown which comprises a conductor duct indicated generally as 3 which is secured by any suitable means such as screws 33 to the lower part of wall 32. For take off of power, receptacles are provided, one of which is shown as 35. This receptacle 35 is shown with a standard plug cap 41 attached. Electrical connection between lead-in conductors and the conductor duct 3 is accomplished by a feed-in box 2. The conductor duct 3 is closed at the ends by end caps 30 which are fitted on the ends of duct 3 and secured to wall 32 as by screws 31. For further detailed description of the receptacles and feed-in device reference should be had to co-pending divisional applications of the above mentioned application Number 252,272.

Figure 2:
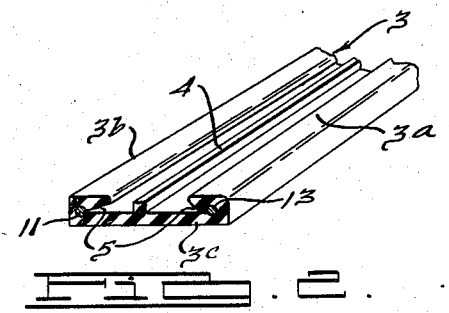
Fig. 2 is a perspective view of a conductor duct which is an embodiment of the invention.

The preferred embodiment of the conductor duct shown in Fig. 2 comprises a body portion 3c formed as a relatively thin flat strip of dielectric material that has the side edges 3a and 3b thereof folded over upon the body portion 3c of the strip but spaced very slightly above the strip body portion 3c so as to provide slots 5 that receive the pair of conductor elements 11, 13. The conductors 11, 13 are concealed from view by the folded over strip edges 3a, 3b but the slots 5 provide very narrow passageways through which outlet receptacle contact elements may be inserted to make contact with the conductors 11, 13. Projecting outwardly from the upper side of the strip body portion 3c is a polarizing or positioning rib 4 that extends longitudinally of the strip, adjacent to, but offset from, the longitudinal center line of the strip. By offsetting the rib 4 it is possible to prevent the connection of the outlet receptacles to the strip 3 in any but the proper manner. Accordingly, proper fusing of the distribution system is readily accomplished. The rib 4 of strip 3 thus establishes the polarity of the power distribution system for it is easy to ascertain that the hot or live conductor 11 is enclosed by the lip 3b and the ground conductor by lip 3a.

Figure 3:
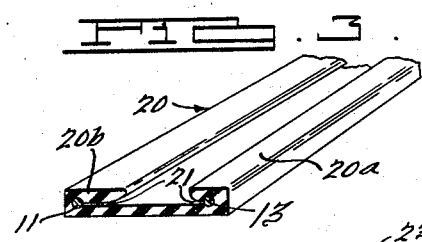
Fig. 3 is a perspective view of another conductor duct embodying the invention.

Figure 3 discloses a modified form of duct strip that does not include a positioning rib such as the rib 4 in the Fig. 2 form of strip-like duct conductor. In the Figure 3 form of the invention, the strip 20 has a dielectric body portion 20c of flat striplike form that has the side edges 20a and 20b thereof folded over on the strip body portion 20c to provide lips that form the slots 21 that receive and practically enclose the duct conductor wires 11 and 13 respectively. It will be noted that the lip 20b is of greater width that the lip 20a in a direction extending transversely of the strip. This unsymmetry of the lips provides a means for establishing the polarity of the system. The live or charged conductor 11 is always concealed in the slots 21 beneath the large lip 20b while the ground or neutral conductor 13 is concealed beneath lip 20a. If a conductor strip of the type shown in Fig. 3 is used, then the outlet receptacle to be used therewith should have its contact elements of different lengths to compensate for the unsymmetrical lip arrangement of this strip. In most electric installations one conductor of a two wire system is above ground potential and therefore is considered a live conductor, and the other conductor is at ground potential and is considered a ground conductor. Therefore, the terms live conductor and ground conductor will be used in that sense in this description.

Figure 4:
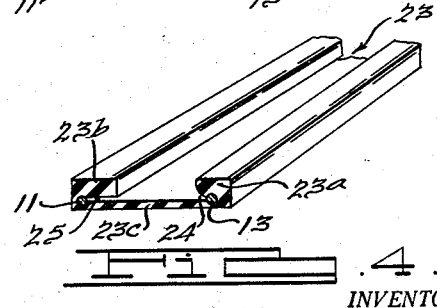
Fig. 4 is a perspective view of still another conductor duct embodying the invention.

Figure 4 shows another form of duct conductor strip 23 that is similar to the form shown in Figure 3 but differs therefrom in that the slots 24 and 25 beneath the lip portions 23a and 23b respectively are of different thicknesses or widths. With the Fig. 4 form of duct strip, an outlet receptacle to be connected therewith has contact elements of different thicknesses so that the receptacle can be connected to the duct strip in only one way and thus the polarity of the system is established. As in the Fig. 3 form, the widths of the strip lips 23a and 23b that overlie the strip body portion 23c may be different to insure that the outlet receptacle can be attached to the strip 23 in only one way.

Figure 5:
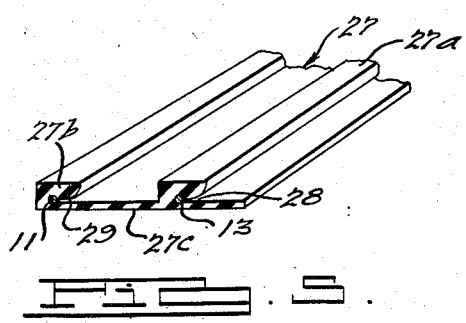
Fig. 5 is a perspective view of still another conductor duct embodying the invention.

Fig. 5 shows still another form of duct conductor strip 27 having a body portion 27c and overlying lip portions 27a and 27b. In this form the lip 27a is not along a side edge of the strip but is spaced inwardly from a side edge so as to extend along a line adjacent the longitudinal center line of the strip. The lips 27a and 27b extend in the same direction so that the slots 28 and 29, beneath the lips 27a and 27b respectively, each open from the lower side of the lip when the strip 27 is installed on a wall or the like. With downwardly opening slots beneath the lips 27a and 27b, a construction is provided that effectively prevents the entrance of water, paint, dust, or the like into the slots 28, 29. Furthermore, with this form of duct construction, it is most difficult to insert foreign objects into the slots 28, 29. An outlet receptacle of special design having both contact elements extending in the same direction would be used with this duct embodiment. Such a receptacle is illustrated in a co-pending divisional application of the above mentioned application Number 252,272.

The above specification describes a novel conductor duct for use in a continuous outlet electric distribution system.

For a determination of the scope of the invention reference should be had to the following claims in which we claim:

1. A continuous outlet electric power distribution duct comprising a strip of dielectric material including a body portion and a plurality of longitudinally extending lip formations overlying the body portion of the strip and providing at least a first and a second parallel groove between respective lip formations and the underlying strip body portion, a conductor element mounted in each groove and arranged to extend longitudinally of the strip, said lip formations and said body portions comprising means for positioning and maintaining said conductor elements in said grooves, and a longitudinally extending and off center integral means on said strip to establish the polarity of the system when the strip is connected to a source of power, said means constructed and operatively positioned so that appliances adapted for connection to and dismounting from said duct at any position along the length thereof may be operatively secured to the duct in a predetermined relationship.

2. A continuous outlet electric power distribution duct comprising a strip of dielectric material including a strip body portion and portions along its side edges overlying the strip body portion to provide a pair of overlying lips with inwardly opening grooves located between the lips and the strip body portion, a longitudinally extending conductor element mounted in each of said grooves beneath each of said lips, said lips and said body portion comprising means for positioning and maintaining said conductor elements in said grooves, and an integral longitudinally extending formation positioned off center and projecting from and carried by said strip body portion providing polarizing means to establish the polarity of the conductor elements mounted beneath the lips, said means constructed and operatively positioned so that appliances adapted for connection to and dismounting from said duct at any position along the length thereof may be operatively secured to the duct in a predetermined relationship.

3. A continuous outlet electric power distribution duct comprising a strip of a dielectric material including a strip body portion and portions along its side edges overlying the body portion to provide a pair of overlying lips with inwardly opening grooves located between the lips and the strip body portion, a longitudinally extending conductor element mounted in the groove beneath each lip, said lips and said body portion comprising means for positioning and maintaining said conductor elements in said grooves, and an integral formation projecting from and carried by said strip body portion providing polarizing means to establish the polarity of the conductor elements mounted beneath the lips, said polarizing means comprising a rib projecting from the strip body portion and extending longitudinally of the strip, said rib being positioned parallel to and on one side of a line positioned midway between said lips, said means constructed and operatively positioned so that appliances adapted for connection to and dismounting from said duct at any position along the length thereof may be operatively secured to the duct in a predetermined relationship.

References Cited in the file of this patent

UNITED STATES PATENTS

| 1,914,074 | Bruijnes et al. | June 13, 1933 |
| 2,131,884 | Brodhecker | Oct. 4, 1938 |
| 2,170,299 | Frank | Aug. 22, 1939 |
| 2,192,899 | Edmonson | Nov. 12, 1940 |
| 2,332,766 | Von Gehr | Oct. 26, 1943 |
| 2,466,566 | Tiscione | Apr. 5, 1949 |